United States Patent [19]

Bolon et al.

[11] 4,360,633

[45] Nov. 23, 1982

[54] COATING SOLUTION OF POLYETHERIMIDE OLIGOMERS

[75] Inventors: Donald A. Bolon; Thomas B. Gorczyca, both of Schenectady, N.Y.

[73] Assignee: General Electric Company, Schenectady, N.Y.

[21] Appl. No.: 287,340

[22] Filed: Jul. 27, 1981

[51] Int. Cl.³ ............................................. C08L 79/08
[52] U.S. Cl. .................................... 524/845; 428/379; 524/600; 524/757; 525/422; 525/928
[58] Field of Search .................. 260/29.2 N; 524/845, 524/757, 736, 718, 744, 773, 600; 525/422, 928; 528/310

[56] References Cited

U.S. PATENT DOCUMENTS

| | | | |
|---|---|---|---|
| 3,847,867 | 11/1974 | Heath et al. ......................... | 528/208 |
| 4,073,788 | 2/1978 | Peterson .............................. | 528/353 |
| 4,115,341 | 9/1978 | Boldebuck et al. ................. | 524/377 |
| 4,157,996 | 6/1979 | Boldebuck et al. ........... | 260/29.2 N |

*Primary Examiner*—Theodore E. Pertilla
*Attorney, Agent, or Firm*—James C. Davis, Jr.

[57] ABSTRACT

Disclosed is a coating solution including an oligomeric polyetherimide component, an oligomeric diamine component, a solvent system and optionally water which may be coated on a substrate and polymerized to form high quality polyetherimide coatings and a process for preparing the solution.

9 Claims, No Drawings

COATING SOLUTION OF POLYETHERIMIDE OLIGOMERS

This invention relates to a coating solution which can be cured to form a smooth insulative coating, more particularly the present invention relates to a coating solution containing oligomeric polyetherimides and to a process for preparing the solution.

U.S. Pat. No. 3,847,867 (Health and Wirth) discloses polyamide acid solutions prepared by reacting aromatic bis(ether anhydrides) and organic diamines in dipolar aprotic organic solvents under ambient conditions. The Health et al patent also discloses use of the solutions as wire coating enamel. U.S. Pat. No. 3,917,643 (Takekoshi and Kochanowski) discloses a wire coating enamel comprising a solution of polyetherimide in a phenolic solvent, such as phenol or mixtures of o-, p- and m-cresols, and a method of making polyetherimides by reacting aromatic bis(ether anhydrides) and organic diamines in the phenolic solvent at temperatures between about 100° C. and 250° C. Both of these materials yield wire enamel with a moderate to high viscosity and a low solids content, both undesirable in present technology.

U.S. Pat. No. 4,115,341 discloses a solution of an ether-acid-amide polymer in glycol ether solvents that can be used as a wire enamel. This material is only slightly imidized, e.g. less than 5%, and needs a low solids content of less than 20% and usually between 5 and 10% to achieve the desired solution viscosity. Recently U.S. Pat. 4,157,996 (Boldebuck and Banucci) disclosed a wire enamel based on polyetherimide monomers. This solution had the required high-solids content, for example, greater than 50%, and could be cast into cured films with good properties.

It has now been found by practice of the present invention that high solids coating solutions containing oligomeric polyetherimides can be prepared by reacting at least one bis(ether anhydride) with less than a stoichometric amount of at least one diamine in a suitable solvent system to form oligomeric polyetheramic acids which are subsequently heated to close the amic acids forming the imides, followed by hydrolysis of the terminal anhydride groups to the free acids. The oligomer solution is then mixed with more diamine, and diluted to a workable viscosity with a suitable solvent. The final coating solution can then be easily coated on substrates and subsequently heated to remove the solvent and to cure the resin thereby forming a smooth, insulative polyetherimide enamel which typically has good thermal characteristics, good dielectric properties and excellent flexibility.

Generally stated, in the present invention there is provided a coating solution including oligomeric polyetherimides formed by:

(a) reacting at least one aromatic bis(ether anhydride) of the formula:

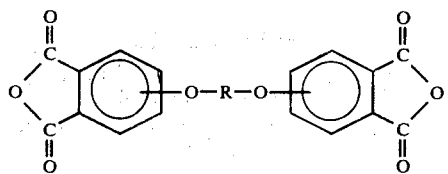

with less than a stoichometric amount of at least one diamine of the general formula:

$$H_2N-R^1-NH_2 \qquad (II)$$

in a suitable solvent to form oligomeric polyetheramic acids containing terminal anhydride groups;

(b) heating the solution of (a) to form oligomeric polyetherimide anhydrides;

(c) hydrolizing the oligomeric anhydrides of (b) to form the free acids of the formula:

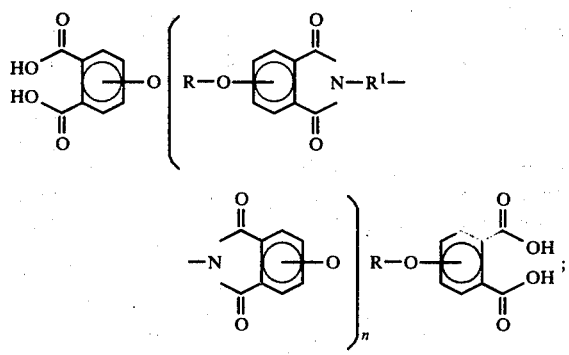

(d) adding to the oligomer solution of (c) more of the same or different diamine, and optionally more solvent and water;

where R is a member selected from the class consisting of (A) divalent organic radicals having the following formulas:

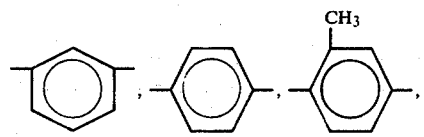

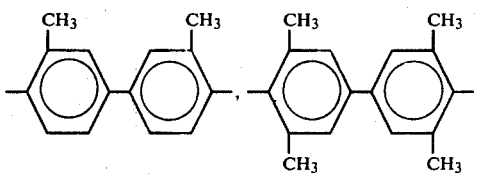

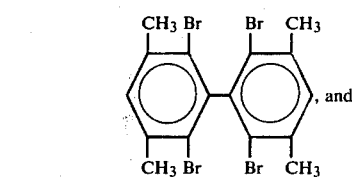

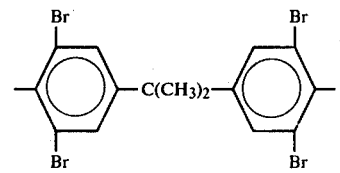

and (B) divalent organic radicals of the general formula:

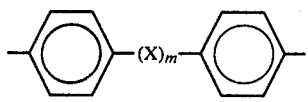

where m is 0 or 1 and X is a member selected from the class consisting of divalent radicals of the formulas,

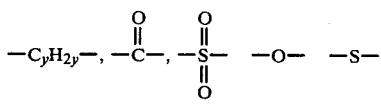

where y is an integer from 1 to 4; $R^1$ is a divalent organic radical selected from the class consisting of (a) aromatic hydrocarbon radicals having from 6 to about 20 carbon atoms and haloginated derivatives thereof, (b) alkylene radicals having from 2 to about 20 carbon atoms, and cycloalkylene radicals having from 3 to about 30 carbon atoms, (c) from $C_2$ to about $C_8$ alkylene terminated polydiorganosiloxane, and (d) divalent radicals of the general formula:

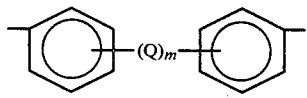

where m is as previously defined and Q is a member selected from the class consisting of

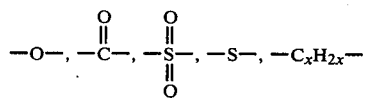

where x is an integer from 1 to 5 inclusive; and n is an integer from 0 to 100, and a method for preparing said coating solution.

Included by the aromatic bis(ether anhydride)s of formula I are compounds having the formulas,

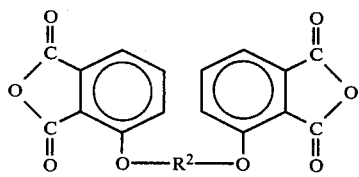
IV.

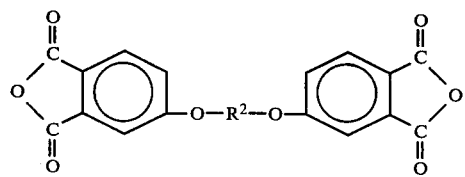
V.

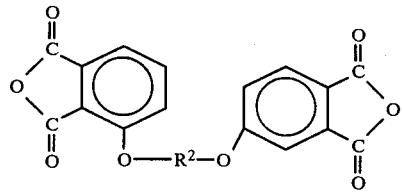

where $R^2$ is

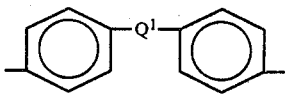

and $Q^1$ is selected from

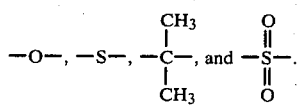
VI.

Dianhydrides included by formula IV are, for example, 2,2-bis[4-(2,3-dicarboxyphenoxy)phenyl]propane dianhydride;

4,4'-bis(2,3-dicarboxyphenoxy)diphenyl ether dianhydride;

1,3-bis(2,3-dicarboxyphenoxy)benzene dianhydride;

4,4'-bis(2,3-dicarboxyphenoxy)diphenyl sulfide dianhydride;

1,4-bis(2,3-dicarboxyphenoxy)benzene dianhydride;

4,4'-bis(2,3-dicarboxyphenoxy)diphenylsulfone dianhydride.

Dianhydrides included by formulas V and VI are, for example, 2,2-bis[4-(3,4-dicarboxyphenoxy)phenyl] propane dianhydride;

4,4'-bis(3,4-dicarboxyphenoxy)diphenyl ether dianhydride;

4,4'-bis(3,4-dicarboxyphenyxy)diphenyl sulfide dianhydride;

1,3-bis(3,4-dicarboxyphenoxy)benzene dianhydride;

1,4-bis(3,4-dicarboxyphenoxy)benzene dianhydride;

4,4'-bis(3,4-dicarboxyphenoxy)diphenylsulfone dianhydride;

4-(2,3-dicarboxyphenoxy)-4'(3,4-dicarboxyphenoxy)-diphenyl-2,2-propane dianhydride, etc.

In addition to formulas IV-V above, aromatic bis(ether anhydride)s also included by formula I are shown by Koton, M. M.; Florinski, F. S.; Bessonov, M. I.; Rudakov, A. P. (Institute of Heteroorganic Compounds, Academy of Sciences, USSR) USSR 257,010, Nov. 11, 1969, Appl. May 3, 1967 and also dianhydrides shown by M. M. Koton, F. S. Florinski, Zh Org. Kin 4(5) 774 (1968).

Some of the aromatic bis(ether anhydride)s of formula I are shown in Darrell Heath and Joseph Wirth, U.S. Pat. No. 3,972,902, and assigned to the same assignee as the present invention. These dianhydrides can be prepared from the hydrolysis, followed by dehydration, of the reaction product of a nitro-substituted phenyl dinitrile with a metal salt of a dihydric phenol compound in the presence of a dipolar aprotic solvent. For example, a benzenoid compound of the formula,

where the $NO_2$ group can be positioned anywhere in the benzene ring, preferably in the 4-position, can be reacted in dimethyl formamide with an alkali metal salt of a dihydric phenol to form an alkali metal salt of the general formula,

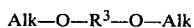

where $R^3$ is a divalent aromatic radical and Alk is an alkali metal ion. Various well known procedures can be used to convert the resulting tetranitriles to the corresponding tetra-acids and dianhydrides.

Included by the alkali metal salts of the above described dihydric phenols are sodium and potassium salts of the following dihydric phenols:
2,2-bis(2-hydroxyphenyl)propane;
2,4'-dihydroxydiphenylmethane;
bis(2-hydroxyphenyl)methane;
2,2-bis(4-hydroxyphenyl)propane hereinafter also identified as "bisphenol-A" or "BPA";
1,1-bis(4-hydroxyphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3'-tetramethylbiphenyl;
2,4'-dihycrosybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide;
3,4'-dihydroxydiphenylmethane;
4,4'-dihydroxybenzophenone;
4,4'-dihydroxydiphenyl ether;
hydroquinone;
resorcinol, etc.

Included by the organic diamines of formula II, are, for example,
m-phenylenediamine;
p-phenylenediamine;
4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5-diaminophthalene;
3,3'-dimethylbenzidine;
3,3'-dimethoxybenzidine;
2,4-bis($\alpha$-amino-t-butyl)toluene;
bis(p-$\beta$-amino-t-butylphenyl)ether;
4,4'-diaminobenzophenone;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
3,3-dimethylpropylenediamine;
octamethylenediamine;
3-methoxyhexamethylenediamine;
2,5-dimethylhexamethylenediamine;
2,6-dimethylheptamethylenediamine;
2-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(3-aminobutyl)tetramethyldisiloxane; etc.

Solvents which can be used in the process of the present invention include phenol and mixtures of o-, p- and m cresols known as cresylic acid and mixtures of cresylic with phenol. In addition phenolic solvent also includes ethylphenols, isopropylphenols, ter-butylphenols, xylenols, mesitols, chlorophenols, dichlorophenols, phenylphenols, etc. The organic solvent component may also be a water-soluble dipolar aprotic solvent, a monoalkyl ether of ethylene glycol having from 1 to about 4 carbon atoms in the alkyl group, a monoalkyl ether of diethylene glycol having from 1 to about 4 carbon atoms in the alkyl group, a monoaryl ether of ethylene glycol or a monoaryl ether of propylene glycol or mixtures thereof. Suitable dipolar aprotic solvents include, for example, N-methyl-2-pyrrolidone, N,N-dimethylformamide, N,N-dimethylacetamide, dimethylsulfoxide, tetramethylurea, mixtures thereof, and the like. Suitable monoalkyl or monoaryl ethers of ethylene glycol include, for example, methyl cellosolve, ethyl cellosolve, propyl cellosolve, butyl cellosolve, phenoxy ethanol, mixtures thereof, and the like. Suitable monoalkyl ethers of diethylene glycol include methyl carbitol, ethyl carbitol, propyl carbitol, butyl carbitol, mixtures thereof, and the like. Suitable monoalkyl or monoaryl ethers of propylene glycol include, for example, propylene glycol phenyl ether, propylene glycol methyl ether, etc. Also included are glycol ether-esters, glycol ether-acetates, glycol ether-butyrates, glycol ether-propionates, and the like. Solvents preferred herein are methyl carbitol, mixtures of methyl carbitol and butyl carbitol, and N-methyl pyrrolidone.

In general, for the oligomer forming reaction solution, the organic diamine component may be included in an amount from about 0.05 mole to about 0.9 mole, preferably from about 0.2 to about 0.8 mole, per mole of dianhydride component. Where more than one compound is included in a component of the present solution, the parts, moles, or other quantity of such component is taken as the sum of the parts, moles, or such other quantity, respectively, of each compound included in such component. Thus, for example, a solution including as the only monomeric reactants, 2.5 moles of 4,4' methylene dianiline, 4.5 moles of 4,4'-bis[4-(3,4-dicarboxyphenoxy)phenyl]propane and 0.5 mole of 4,4'bis[4-(2,3-dicarboxyphenoxy)phenyl]propane has a ratio of 0.5 mole of organic diamine component per one mole of the dianhydride component.

Experience has shown that sufficient solvent should be utilized to provide a solids content to provide a solution with a workable viscosity for stirring and handling.

Oligomer formation can be effected at temperatures of from about 80° C. to 250° C., and preferably from about 100° C. to 200° C.

It is preferred to effect the reaction of the dianhydride and the organic diamine in an inert atmosphere such as nitrogen.

In order to provide optimum contact between the aromatic bis(ether anhydride) and the organic diamine, in the oligomerization reaction solution, the reaction solution can be agitated such as by stirring, etc.

The molar proportions of the monomers used to form the oligomer will vary depending on the molecular weight desired for the oligomer. A high molecular weight oligomer will give a smoother coat, e.g. on wire, but will require more dilution with solvent and consequently more time and energy will be needed in the wire tower for drying and curing. A lower molecular weight oligomer will allow a higher solids content in the coation solution thereby requiring less solvent to obtain a workable coating viscosity and thereby facilitating faster curing and less energy consumption.

Oligomerization reaction time for the bis(ether anhydride) of formula I and the organic diamine of formula II can vary from 0.1 to 20 hours depending upon such factors as the temperature employed, degree of stirring, nature of the reactants, etc.

During the course of oligomer formation and imidization, water may be distilled. The course of reaction may be readily determined, in some cases, by the actual amount of water generated, as a percentage of the theoretical. In particular instances, a mixed solvent system can be employed consisting of a phenolic solvent and a low boiling solvent which forms an azeotropic mixture with water. The low boiling solvents such as cyclohexane, benzene, toluene, chlorobenzene, etc. can be used.

At the termination of the oligomerization and hydrolysis reactions, the more diamines and optionally more solvents are added to form the final coating solution.

In preparing the final coating solution, an amount of the same or different diamine must be added to provide substantially stoichometric amounts of reactants to provide for optimum molecular weight of the final polyetherimide enamel; however, there can be employed from 0.5 to 2 moles and preferably 1.0 to 1.2 moles of diamine per mole of dianhydride for effective results. A slight excess of diamine is usually desirable for film flexibility or possible cross-linking. It has been found that the polyetherimide enamel can have from about 5 to 500 repeating dianhydride-diamine reaction product units and preferably from 10 to 200. Terminal amino and phthalic acid or phthalic anhydride end groups can be present.

Final coating solutions having high ratios of reactants to organic solvent component advantageously minimize the amount of organic solvent released during subsequent formation and cure of polyetherimide resins as in coating operations. Such solutions having high amounts of reactants may have higher viscosities than desired for some coating applications. Typically, inclusion of water decreases the solution viscosity. A given decrease in viscosity may be effected using a lower amount of added water relative to the amount of added organic solvent component which would be required to effect the same viscosity decrease.

Water may be present in any amount up to the maximum amount at which the solution is substantially free of precipitate. Although water is miscible with most of the organic solvent components inclusion of too much water in the coating solution results in precipitate or other plural phase formation. The amount of water which may be present depends on the particular components present, the particular organic solvent component, and the weight ratio of reactants to organic solvent.

Advantageously, the present final coating solutions may include reactants in a combined amount of 25 or more percent, e.g. from about 25 to 75 or more percent by weight based on the weight of the solution. In general, solutions of such concentrations, including water as may be required, have suitable viscosities in the temperature range, e.g. between 150 CPS and 5000 CPS at about 20° to about 40°, normally used in metal conductor (e.g. wire) enameling operations for employment therein. Heretofore known polyetherimide wire enameling solutions typically contain 15 to 25 percent by weight polyether-amide-acid polymer in organic solvents, wherein the polymer concentration is limited to the indicated low amounts due at least in part to the often unacceptably high viscosity of more highly concentrated polymer solutions. Coating solutions of etherimide monomers with solids contents of up to 75% have been disclosed but exhibited poor film forming properties. Advantages of the present highly concentrated oligomer solutions include a low amount of total solvent to be removed in preparing coatings, low energy consumption for solvent removal, and better film forming properties.

The final coating solution may be prepared by mixing, as by stirring, until the components are dissolved. In general, the various components; (oligomer solution, added diamine, solvent,) may be added in any sequence. If desired, the monomeric and oligomeric components may be dissolved in the organic solvent component, followed by adding water or solvent with stirring until a desired decrease in viscosity is effected. However, solutions including water are more easily prepared by adding the reactant components with stirring to a solution of the water and organic solvent component. Preparation of the solution is generally accelerated at elevated temperatures.

The polyetherimide reaction products can be reinforced with conventional fillers, for example, perlite, fume silica, etc., carbon whiskers, glass fibers, etc. at proportions of from 10 to 60 parts of filler, per 100 parts by weight of polyetherimide.

The liquid coating solutions of the present invention have many and varied uses. The coating solutions may be applied to a variety of substrates using any suitable coating method, e.g. dipping, brushing, spraying, wiping and the like, and thereafter heated to evaporate the solvent system and form cured polyetherimide resinous coatings. The temperature is preferably increased gradually to produce smooth resinous coatings. The polymerization and cure proceeds advantageously at a temperature of from 125° C. to about 300° C. or more.

The present coating solutions may be employed as wire enamels to form resinous insulating coatings on copper and aluminum wire, as varnishes for coating or impregnating various substrates such as coils of previously insulated wire (e.g. in motor and generator coils), woven and non-woven fabrics, etc. Additives, e.g. light stabilizers, oxidation inhibitors, surfactants, etc., may be included in the present coating solutions.

In order that those skilled in the art will be able to practice the invention, the following examples are given by way of illustration and not by way of limitation. All parts are by weight.

EXAMPLE

An oligomer solution is first prepared by reacting 1653 grams (6.358 equivalent) of 2,2-bis[4,3-dicarboxyphenoxy)phenyl]propane dianhydride with 378 grams (3.81 equivalents) of 4,4'-methylene dianiline in the presence of 2438 grams of a glycol ether solvent system and 90 grams of water. The glycol ether solvent solution contained 51% monomethyl ether of diethylene glycol, 8% monoethyl ether of diethylene glycol, 11% monobutyl ether of diethylene glycol, and 30% 2-hydroxy propyl phenyl ether. The oligomerization reaction and hydrolysis were carried out in a 5 liter glass reaction vessel equipped with a Dean-Stark trap, electric stirrer, thermometer, and a reflux condensor. An inert atmosphere was maintained throughout the reaction. This monomer solution was heated to 133° C. for 2 hours with constant stirring while approximately 45 grams of water was distilled and the oligomers formed and imidized. The oligomer solution obtained was then cooled to ambient temperature and 189 grams of 4,4'-methylene dianiline was added to bring the diamine content to 90% of the theoretical equivalency. During the heating, the solution becomes very viscous due to the amide-acid formation. Continued heating imidizes the amide acid groups with release of water and a consequent decrease in solution viscosity. This released water along with the initially added water hydrolyzes most remaining anhydride groups. The oligomer solution was then diluted with 614 additional grams of the glycol ether solvent solution to lower the viscosity and yield the oligomer solution. The final coating solutions were prepared from this oligomer solution.

Coating Solution I 1362 grams of oligomer solution 32 grams of 4,4-methylene diamine (10% excess amine)

Coating Solution II 1173 grams of oligomer solution 18 grams of 4,4-methylene diamine (3% excess amine)

These final coating solutions including oligomers were then coated on wire by standard techniques and cured to form coatings with smoothness acceptable for use in high speed wire winding machines where heretofore it was believed that the polyetherimide had to be in the monomeric or polymeric form in order to form smooth coatings.

Other modifications and variations of the present invention are possible in light of the above teachings. It is, therefore, to be understood that changes may be made in the particular embodiments described above which are within the full intended scope of the present invention as defined in the appended claims.

What is claimed is:

1. A coating solution including oligomeric polyetherimides formed by:

(a) reacting at least one aromatic bis(ether anhydride) of the formula:

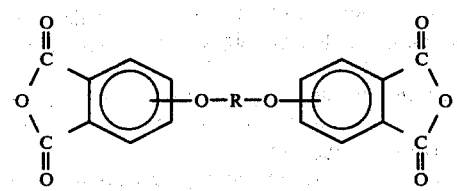

with less than a stoichometric amount of at least one diamine of the general formula:

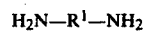

$H_2N-R^1-NH_2$ in a suitable solvent to form oligomeric polytheramic acids containing terminal anhydride groups;

(b) heating the solution of (a) to a temperature between 80° C. and 250° C. to form oligomeric polyetherimide anhydrides;

(c) hydrolizing the oligomeric anhydrides of (b) to form the free acids of the formula:

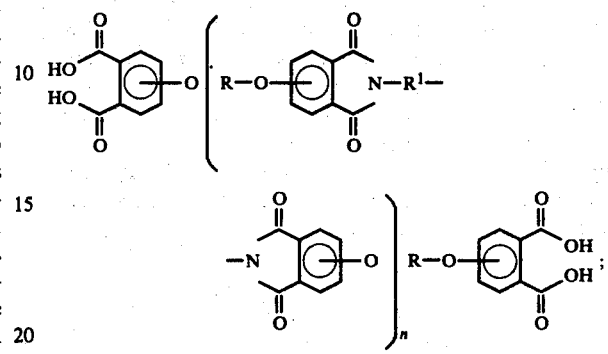

(d) adding to the oligomer solution of (c) more of the same or different diamine, and optionally more solvent and water, where R is a member selected from the class consisting of (A) divalent organic radicals having the following formulas:

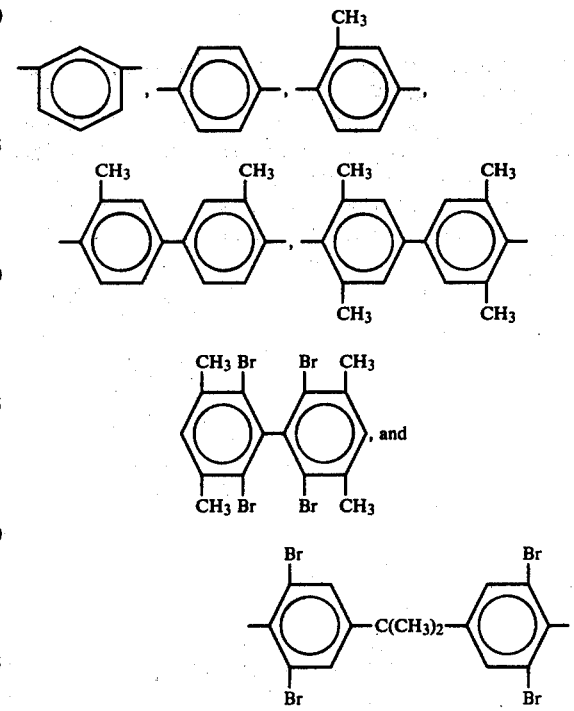

and (B) divalent organic radicals of the general formula:

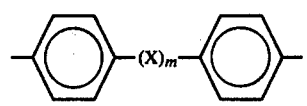

where m is 0 or 1 and X is a member selected from the class consisting of divalent radicals of the formulas,

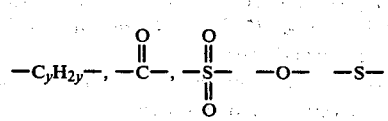

where y is an integer from 1 to 4; $R^1$ is a divalent organic radical selected from the class consisting of (a) aromatic hydrocarbon radicals having from 6 to about 20 carbon atoms and haloginated derivatives thereof, (b) alkylene radicals having from 2 to about 20 carbon atoms, and cycloalkylene radicals having from 3 to about 30 carbon atoms, (c) from $C_2$ to about $C_8$ alkylene terminated polydiorganosiloxane, and (d) divalent radicals of the general formula:

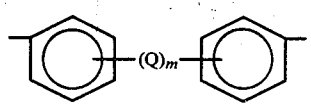

where m is as previously defined and Q is a member selected from the class consisting of

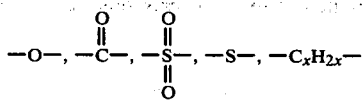

where x is an integer from 1 to 5 inclusive; and n is an integer from 0 to 100.

2. The coating solution of claim 1 wherein the diamine is used in a ratio of between 0.5 and 0.2 moles diamine per mole of dianhydride.

3. The coating solution of claim 1 wherein the diamine is used in a ratio of between 1.0 and 1.2 moles diamine per mole of dianhydride.

4. The coating solution of claim 1 where the aromatic bis(ether anhydride) is

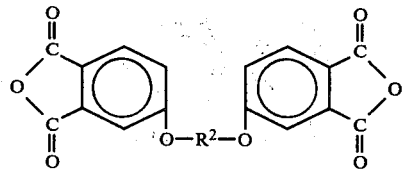

where $R^2$ is

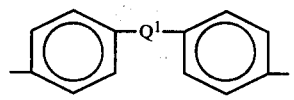

and $Q^1$ is selected from

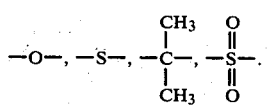

5. The coating solution of claim 1 where the aromatic bis(ether anhydride) is

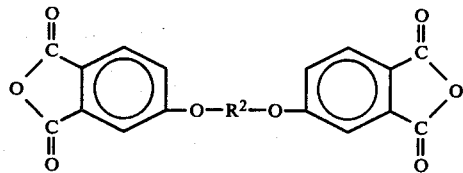

where $R^2$ is

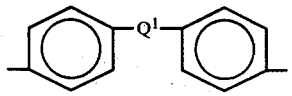

and $Q^1$ is selected from

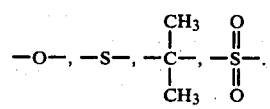

6. The coating solution of claim 1 where the organic diamine is methylene dianiline.

7. The coating solution of claim 1 where the organic diamine is oxydianiline.

8. The coating solution of claim 1, where the aromatic bis(ether anhydride) is 2,2-bis[4-3(3,4-dicarboxyphenoxy)phenyl]propane dianhydride and the organic diamine is 4,4'-methylenedianiline.

9. A process for preparing a coating solution which includes oligomeric polyetherimides comprising:
(a) reacting at least one aromatic bis(ether anhydride) of the formula:

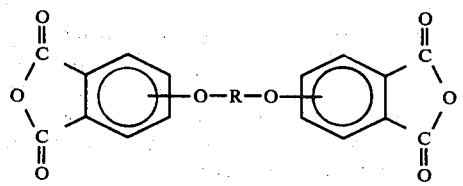

with less than a stoichometric amount of at least one diamine of the general formula:

in a suitable solvent to form oligomeric polyetheramic acids containing terminal anhydride groups (b) heating the solution of (a) to a temperature between 80° C. and 250° C. to form oligomeric polyetherimide anhydrides (c) hydrolizing the oligomeric anhydrides of (b) to form the free acids of the formula:

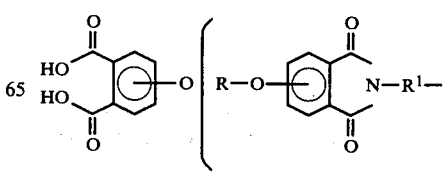

-continued

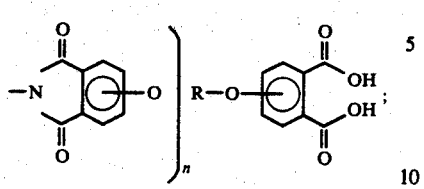

(d) adding to the oligomer solution of (c) more of the same or different diamine, and optionally more solvent and water, where R is a member selected from the class consisting of (A) divalent organic radicals having the following formulas:

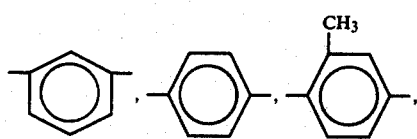

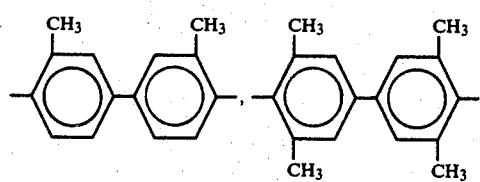

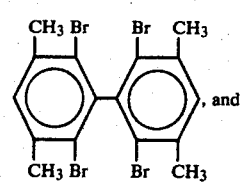, and

-continued

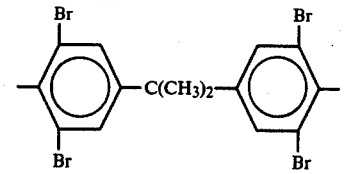

and (B) divalent organic radicals of the general formula:

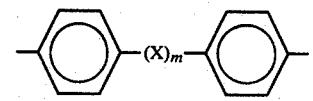

where m is 0 or 1 and X is a member selected from the class consisting of divalent radicals of the formulas,

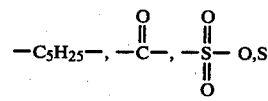

where y is an integer from 1 to 4; $R^1$ is a divalent organic radical selected from the class consisting of (a) aromatic hydrocarbon radicals having from 6 to about 20 carbon atoms and haloginated derivatives thereof, (b) alkylene radicals having from 2 to about 20 carbon atoms, and cycloalkylene radicals having from 3 to about 30 carbon atoms, (c) from $C_2$ to about $C_8$ alkylene terminated polydiorganosiloxane, and (d) divalent radicals of the general formula:

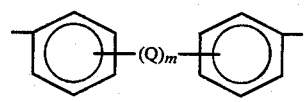

where m is as previously defined and Q is a member selected from the class consisting of

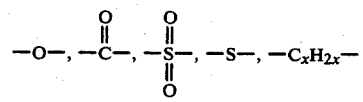

where x is an integer from 1 to 5 inclusive, and n is an integer from 0 to 100.

* * * * *